Dec. 18, 1945.  W. F. GROENE  2,391,154
TAILSTOCK FOR LATHES
Filed May 10, 1943  5 Sheets-Sheet 1
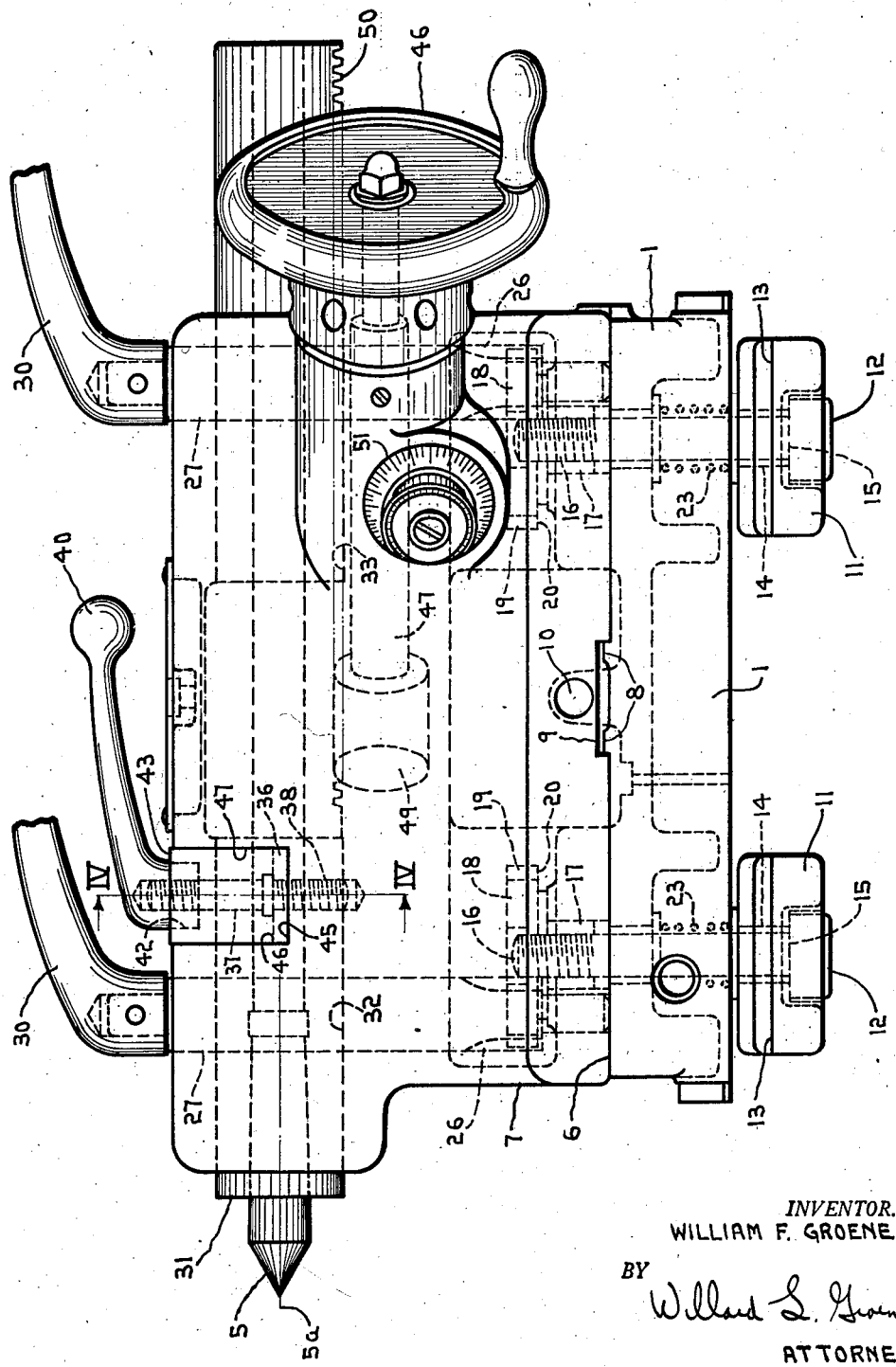
FIG. I
INVENTOR.
WILLIAM F. GROENE
BY
Willard L. Groene
ATTORNEY

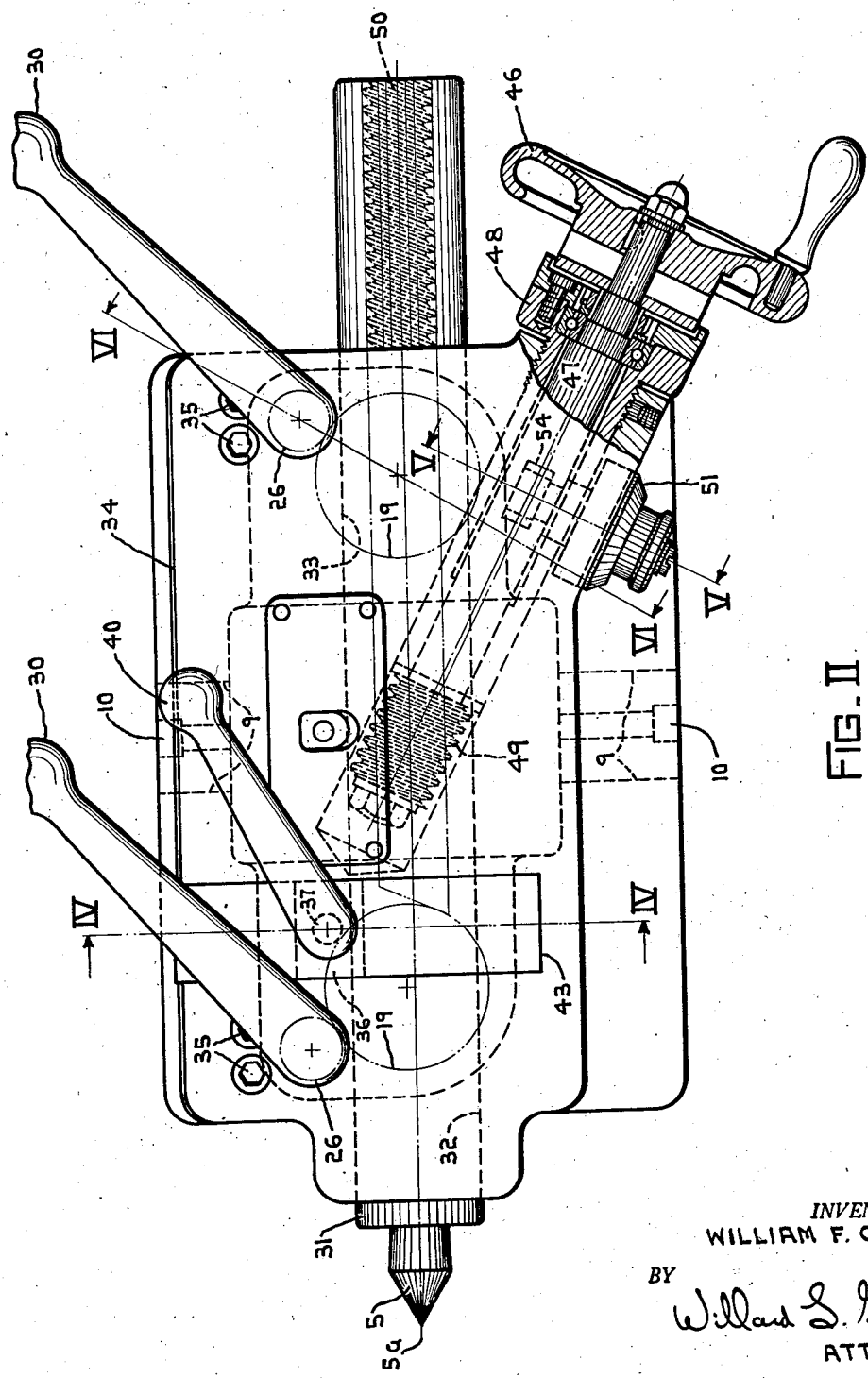

Dec. 18, 1945.    W. F. GROENE    2,391,154
TAILSTOCK FOR LATHES
Filed May 10, 1943    5 Sheets-Sheet 3
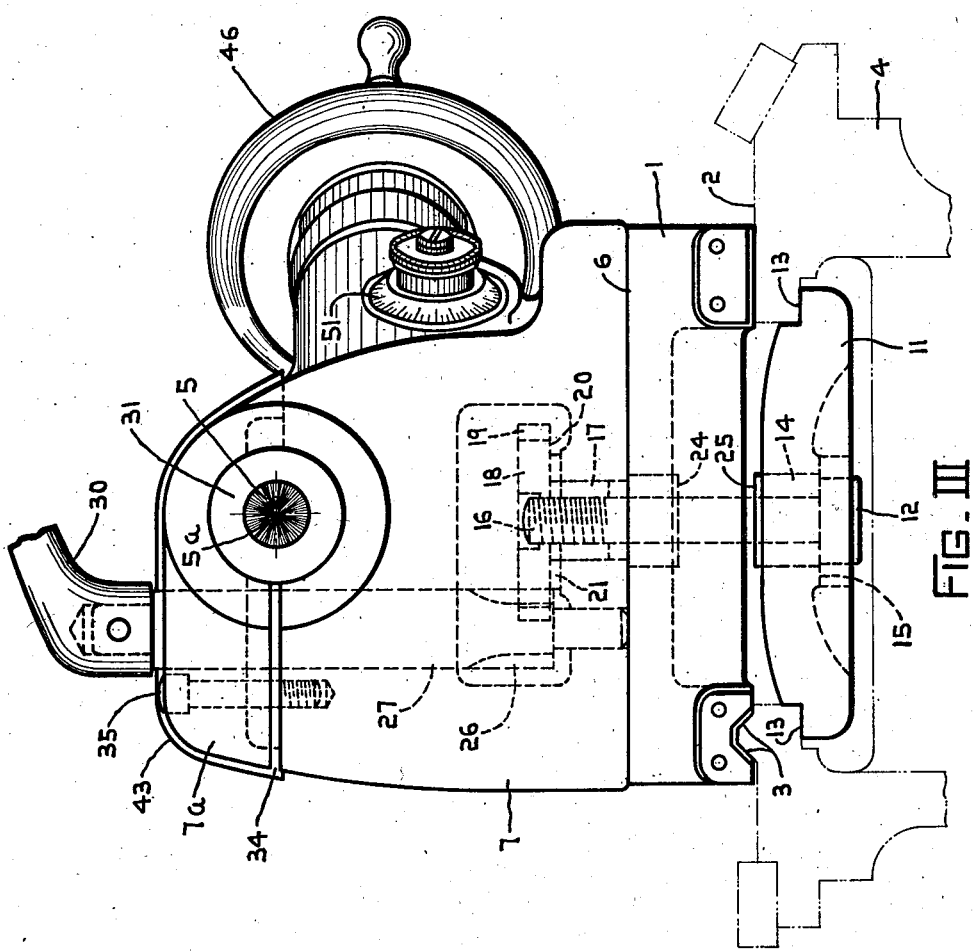
INVENTOR.
WILLIAM F. GROENE
BY
ATTORNEY

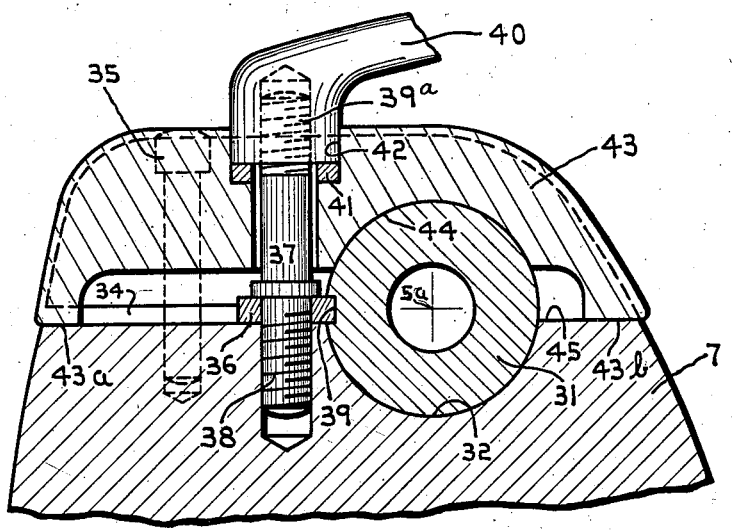
FIG. IV
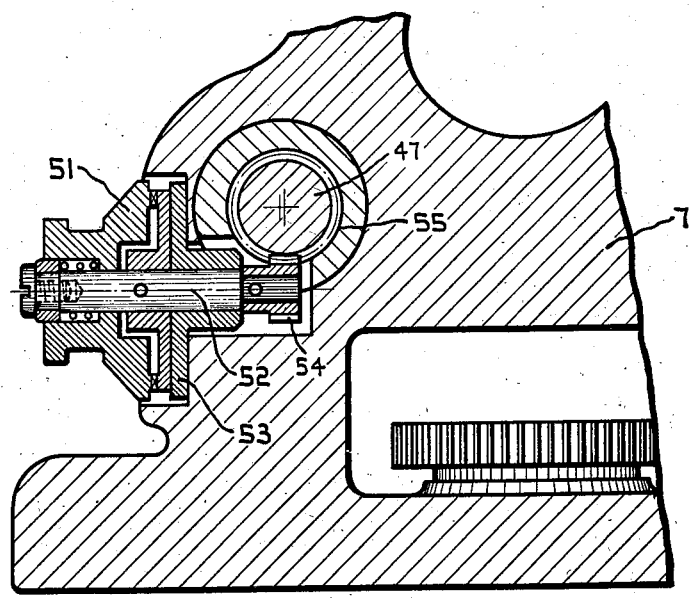
FIG. V

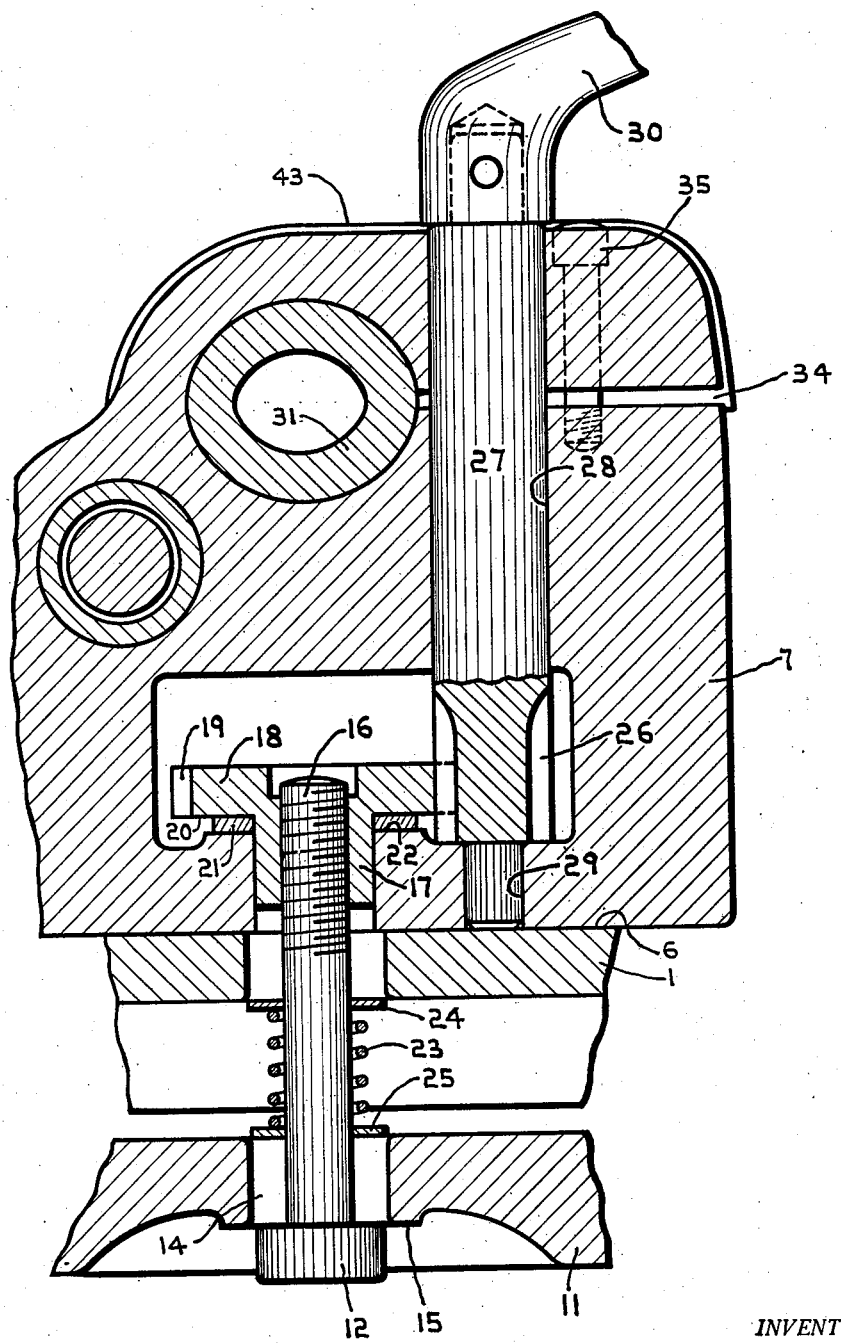
FIG. VI

Patented Dec. 18, 1945

2,391,154

UNITED STATES PATENT OFFICE 2,391,154

TAILSTOCK FOR LATHES

William F. Groene, Cincinnati, Ohio, assignor to The R. K. Le Blond Machine Tool Company, Cincinnati, Ohio, a corporation of Delaware Application May 10, 1943, Serial No. 486,295

6 Claims. (Cl. 82—31)

This invention pertains to tailstock for lathe and is particularly related to improvements in the mechanism for manipulating and operating the tailstock to carry out its various functions in a lathe.

One of the chief objects of this invention is to provide improved clamping mechanism for locking the tailstock to the bed ways of the lathe in such a way as to require a minimum of effort and skill upon the part of the operator in effecting the clamping operation of the tailstock on the bed. It is an object in connection with this improvement to provide a gearing mechanism associated with the clamping of the tailstocks to the bed of the lathe which has a reduction factor to enhance the degree of clamping with a relatively minimum amount of effort on the part of the operator. It is also an object to arrange the clamping mechanism so that the operating handles for locking the tailstock to the bed, may be readily positioned in a convenient location so as not to interfere with the proper operation and manipulation of the tailstock or with the work being done in the lathe.

Another object of this invention is to provide an improved clamping mechanism for locking the tailstock barrel against axial movement in the tailstock body in such a way that the clamping of the tailstock barrel in the tailstock in no way affects the accurate positioning of the tailstock barrel on the proper axis of alignment of the lathe. In this connection it is an object to provide bearings for the tailstock barrel at each end of the tailstock which may be readily adjusted to zero clearance for accurate positive sliding of the tailstock spindle in the tailstock housing and to provide, intermediate said accurately fitting bearings, means for clamping the tailstock barrel against axial movement when it is properly seated in the center of the work piece to be turned in the lathe. Means are provided for accurately adjusting the bearings carrying the tailstock spindle to take up any wear so as to maintain the continued accuracy of the tailstock and the location of its spindle at all times on the proper axis of rotation of the lathe.

Further features and advantages of this invention will appear from a detailed description of the drawings in which:

Figure I is a front elevational view of the tailstock, particularly showing the clamping mechanism for locking the tailstock to the bed of the lathe and the clamping apparatus for locking the tailstock spindle against axial movement in the tailstock body.

Figure II is a plan view of the tailstock shown in Figure I, particularly illustrating the worm and angular rack mechanism and the handwheel operating device for effecting axial adjustment of the tailstock spindle in the tailstock housing for presenting its center to a work piece in the lathe.

Figure III is a left hand end view of the tailstock showing a portion of the clamping mechanism for locking the tailstock to the bed of the lathe as seen looking toward the center of the tailstock.

Figure IV is a fragmentary sectional view on the line IV—IV of Figures I and II particularly showing the clamping and locking device for holding the tailstock spindle against axial movement in the tailstock body.

Figure V is a fragmentary sectional view on the line V—V of Figure II particularly showing the dial indicating means for accurate positioning of the tailstock spindle lengthwise in the tailstock housing.

Figure VI is an enlarged fragmentary sectional view on the line VI—VI of Figure II showing the detailed construction of the clamping mechanism for locking the tailstock body to the bed of the lathe.

The tailstock comprises a bottom 1 which appropriately rests on the ways 2 and 3 of the bed 4 of a lathe to slide there along while maintaining the center 5 of the tailstock in accurate alignment with the work spindle axis 5a of the lathe. On the top surface 6 of the tailstock bottom 1 is mounted the tailstock body 7 which may be moved crosswise of the lathe axis 5a on the tongue 8 of the bottom 1 which operates in the groove 9 on the bottom of the tailstock body 7 by appropriate adjusting screws 10, as in a conventional manner for tailstocks. This apparatus will not be described in further detail as it forms no specific part of the present invention. When in operation in the lathe the bottom 1 and body portion 7 are rigidly held together so that in effect they function as one solid integral body and may be considered as such for the purposes of this description.

The tailstock 1—7 may be rigidly clamped to the ways 2 and 3 of the bed 4 by means of a pair of identical clamps 11, Figures I, III, and VI, which are each carried on a T-slot bolt 12 and have bed engaging surfaces 13 engaging the bed underneath the ways 2 and 3 when the T-slot bolt 12 is pulled upwardly. The T-slot bolt passes through a clearance hole 14 in the clamp 11 so as to permit the sidewise adjustment of the tailstock body 7 on the bottom 1 as mentioned above.

Referring more specifically to Figure VI the T-slot bolt 12 engages the surface 15 of the clamp 11 and has a threaded upper portion 16 on which is threadedly mounted the tightening nut 17 having a gear portion 18 formed integral therewith on which are the gear teeth 19. The undersurface 20 of the gear 18 bears against the thrust collar 21 carried on the surface 22 of the tailstock body 7 so as to take care of downward thrusts of the gear and nut 17 when the gear 19 is driven to rotate it on the threaded portion 16 of the screw 12 to thus draw the clamp 11 upwardly firmly against the surfaces 13—13 against the bed 4 of the lathe. A suitable compression spring 23 is provided around the screw 12 and operates against washers 24 and 25 to normally keep the bolt 12 and gear 18 in downward position so to permit the dropping of the clamp 11 when loosened to permit the free sliding of the tailstock along the bed of the lathe.

The gear 19 is actuated by a pinion 26 formed integral with the rock shaft 27 journaled in the bearing portions 28 of the tailstock body 7 and journaled in a pilot bearing 29 at its lower end also in this tailstock housing 7. On the upper end of the rock shaft 27 is fixed an operating handle 30 by which the shaft 27 may be rotated to operate the gear 19 and thus tighten the bolt 12 to effect clamping of the tailstock on the bed of the lathe. It will be noted that the bearing 28 provided for the shaft 27 is relatively long and self supporting so that the shaft 27 may be raised to re-engage the gear 26 in a different relative position in the gear 19 so the control lever 30 may be kept in proper oriented position with respect to the tailstock body and other operating mechanisms thereof to place it in the most convenient and power-applying position for the operator. Merely by lifting the handle 30 and the shaft 27 the lever may be presented to any of the desired positions for tightening or loosening the headstock clamp 11.

Thus with this construction there is a gear reduction between the gear 26 and 19 so that high power may be applied to the gear 19 to tighten the bolt 12 by relatively light pressure on the operating handle 30. Furthermore, it is not necessary to remove a wrench each time and to again place it upon a nut on top of the rock shaft 27 as the handle is fixed integrally with the rock shaft 27 and it is merely necessary for the operator to raise the shaft slightly in the bearing 28 to remove its gear 26 from engagement with the gear 19 and then to bring it back down again to re-engage it to a new position to effect the continued tightening of the bolt 12 while still maintaining the operating lever 30 in the proper desired operating position on the tailstock.

In the upper portion of the tailstock body 7 is mounted the tailstock spindle or barrel 31 carrying the usual lathe center 5. This tailstock spindle 31 is axially slidable in bearings 32 and 33 as best shown in Figure I. The tailstock is provided with a saw slot 34 extending the full length of the rear portion of the tailstock behind the spindle 31 as best seen in Figures II, III, and IV. Perpendicular to the slot 34 are adjusting screws 35 which may be tightened so as securely to hold the upper portion 7a to the tailstock body 7 and which when slightly loosened form a snug sliding bearing for the tailstock spindle 31 in the bearings 32 and 33. Once this adjustment has been accurately and carefully made the tailstock spindle will therefore be accurately guided in sliding movement along the work spindle axis at all times. Any wear which may also occur in these bearings 32 and 33 may be readily taken up by appropriately adjusting the screws 35. Referring more specifically to Figure IV, there is shown the clamping mechanism for locking the tailstock spindle 31 against axial movement in the tailstock body 7 when its center 5 is appropriately presented to a work piece in the lathe. A suitable key 36 is held in place by a clamping stud 37 threaded at 38 into the headstock body 7 and engages in a slot 39 formed longitudinally of the tailstock spindle 31 to prevent rotation of the spindle 31 in the tailstock during the operation of the lathe. The upper portion of this stud 37 has a threaded portion 39a upon which operates the clamping handle 40 which thrusts downwardly against the thrust collar 41 carried in a counter bore 42 formed in the tailstock spindle clamp 43. This clamp is provided with an arcuate spindle engaging surface 44 which nicely slidingly fits against part of the periphery of the tailstock spindle 31 and has a foot 43a and another foot 43b which engages a surface 45 formed by a slot 45, 46, and 47, Figure I, cut through the top of the tailstock transverse to the bearing 32. This clamp is normally pressed downward in its middle portion by operating the clamping handle 40 so as to bring the arcuate surface 44 tightly against the spindle 31 so as to lock it in any desired position when its center 5 is set in the workpiece of the lathe.

By this arrangement it will be noted that clamping force is provided directly over the tailstock barrel and in a vertical direction so as not to interfere with the relative movement of the work spindle in the bearings 32 and 33 in the event they would become slightly worn. It will be noted that with this design of clamp the clamping pressure may be applied substantially on top of the spindle 31 and very closely thereto so as to provide a uniform down-clamping pressure thereon rather than relying on the pinching together of the upper portion of the tailstock as in more conventional practice. Also with this general arrangement of the bearings 32 and 33 and the independent clamping mechanism as shown in Figure IV, when the tailstock spindle is loosened from the clamp 43 it will still be held in accurate nicely sliding position in the bearings 32 and 33 for the initial accurate setting of the work prior to clamping. Thus the clamping action of the clamp 43 has no relative effect on changing the position of the work spindle of the tailstock spindle 31 whether it is clamped or not.

The tailstock spindle 31 may be actuated axially in the bearings 32 and 33 by a suitable handwheel 46 which operates the worm shaft 47 carried in the sleeve 48 and which has a worm 49 which operates in the rack 50 cut on the bottom of the spindle 31 in a manner as fully set forth in Patent 2,062,790 dated December 1, 1936. Also, appropriate dial indicating mechanism as seen in Figure V is provided comprising an indicating dial 51 carried on a shaft 52 journaled in the bracket 53 mounted in the tailstock body 7 and having a worm wheel 54 operating in a worm 55 formed on the shaft 47 so that rotation of the handwheel 46 and the shaft 47 will indicate the relative travel of the tailstock spindle 31 in the tailstock body 7, as fully shown in Patent 2,250,640 issued July 29, 1941.

I claim:

1. In a tailstock for a lathe, a tailstock body, means for clamping said tailstock body to the bed of said lathe comprising, a clamp extending under the ways of said bed upon which said tailstock is mounted, a clamp bolt passing through said clamp and extending upwardly into a cavity in said tailstock body, means for drawing said bolt and clamp upwardly toward the underneath side of the ways of said bed comprising a gear journaled in said tailstock body having a threaded bore operating around the threaded portion of said bolt, and means for rotating said gear manually by means of a rock shaft vertically reciprocatable in a journal bearing in said tailstock body, a pinion formed on said rock shaft, an operating shaft fixed on the upper end of said rock shaft, and means whereby said rock shaft may be raised or lowered in said journal bearings to engage its pinion in different relative positions of engagement with said gear so as to effect operation of said gear and clamping mechanism for any desired position of said operating handle with respect to said tailstock.

2. In a tailstock, a body, a pair of split bearings extending longitudinally of said tailstock, a tailstock spindle axially reciprocable in said bearings, means for adjusting the split portion of said bearings to effect an accurate sliding engagement of said bearings with said spindle, and means independent of said split bearing portions of said tailstock for clamping said spindle to said tailstock body, said clamping mechanism comprising a clamp mounted on said tailstock body and having a surface engaging part of the periphery of said spindle for locking said spindle against axial movement when said clamp is operated and foot portions for spacing said clamp from said tailstock body.

3. In a tailstock, a body, a pair of split bearings extending longitudinally of said tailstock, a tailstock spindle axially reciprocable in said bearings, means for adjusting the split portion of said bearings to effect an accurate sliding engagement of said bearings with said spindle, and means independent of said split bearing portions of said tailstock for clamping said spindle to said tailstock body, said clamping mechanism comprising a clamp mounted on said tailstock body and having a surface engaging part of the periphery of said spindle for locking said spindle against axial movement when said clamp is operated, said clamp comprising a springable clamp bar member having an arcuate surface engaging the periphery of said spindle and having abutment portions at each end thereof each side of said spindle engaging a surface on said tailstock body so that when unclamped said arcuate surface is normally disengaged from tight clamping engagement with said spindle, and clamping means comprising a manually operated nut and stud arrangement for drawing down the center portion of said clamp to engage its arcuate surface tightly on said spindle to lock it against axial movement in said tailstock body.

4. In a tailstock, a body, a spindle slidably fitting a bore of said body, said body being split axially of said spindle to form with said bore a pair of adjustable bearings for said spindle, means operable to adjust said bearings to effect an accurate sliding engagement between said bearings and spindle, and means independent of said split bearing portions of said tailstock for clamping said spindle to said tailstock body, said clamping means having foot portions for spacing said clamping means from said tailstock body.

5. A tailstock for a lathe having spaced parallel ways, a tailstock body slidably guided by and along said ways, a clamp positioned beneath said ways, a threaded bolt passing through said clamp between said ways and into a chamber in said body, a gear in said chamber threadedly engaging said bolt, a rock shaft supported in said body for rotation and axial movement, said shaft having pinion means meshing with said gear means, said pinion means being withdrawable from mesh with said gear means on axial movement of said rock shaft.

6. A tailstock for lathes comprising, in combination, a tailstock body having a bore, said body being split to form with said bore a contractable bearing, a spindle slidably fitting said bore, means on said body operable to contract said bearing to precisely mount said spindle for sliding adjustment, there being a kerf in said body transversely of and intersecting said bore, a spindle clamp fitting said kerf and partially surrounding said spindle, said clamp having spaced feet on opposite sides of said spindle and engaging the bottom of said kerf, and means operable to force said clamp into said kerf at a point between said feet, to thereby clamp said spindle in axially adjusted position.

WILLIAM F. GROENE.